No. 781,812. PATENTED FEB. 7, 1905.
F. B. DEITER.
ROLLING PIN.
APPLICATION FILED MAR. 23, 1904.
2 SHEETS—SHEET 2.
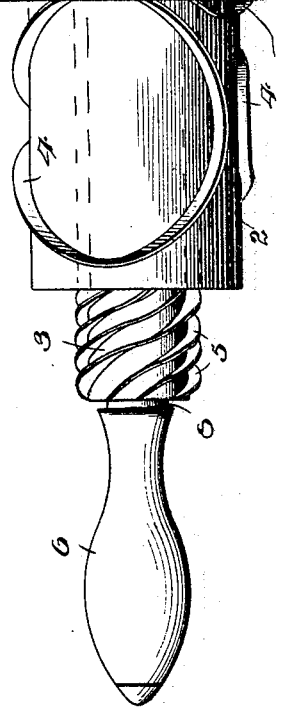
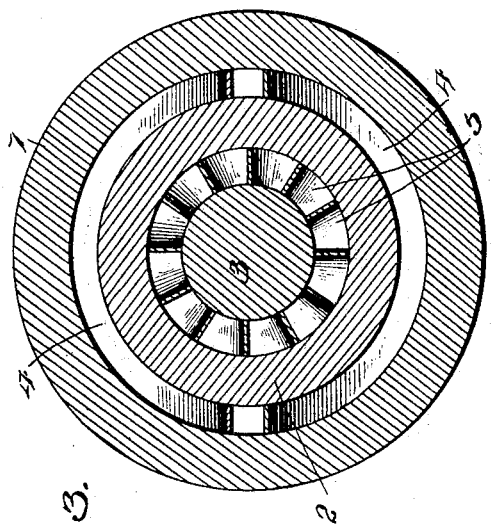
Inventor
F. B. Deiter.
Witnesses
By
R. W. A. D. Lacey, Attorneys No. 781,812.                                                                 Patented February 7, 1905.

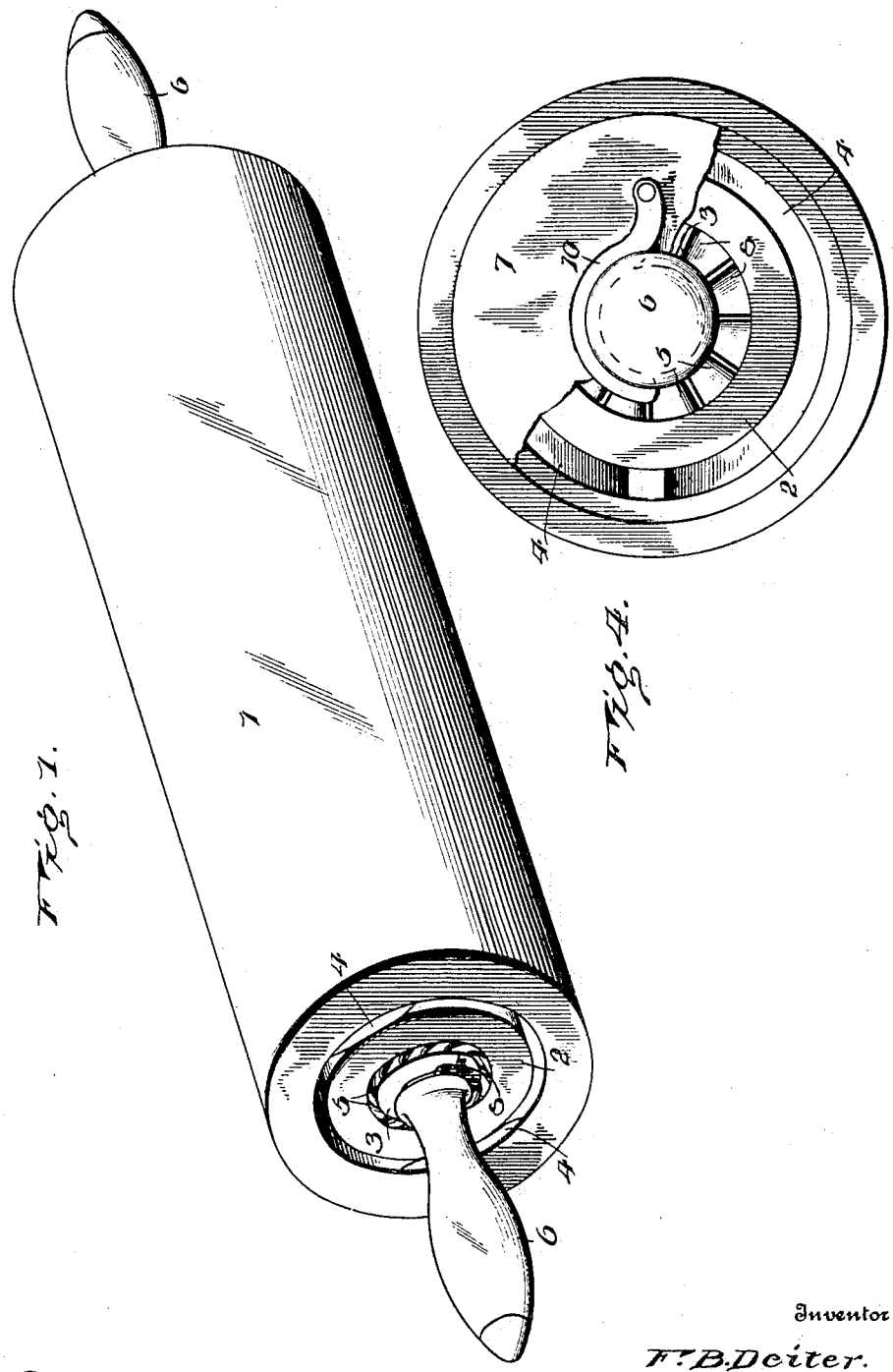

UNITED STATES PATENT OFFICE.

FRANK B. DEITER, OF COUDERSPORT, PENNSYLVANIA.

ROLLING-PIN.

SPECIFICATION forming part of Letters Patent No. 781,812, dated February 7, 1905.

Application filed March 23, 1904. Serial No. 199,619.

*To all whom it may concern:*

Be it known that I, FRANK B. DEITER, a citizen of the United States, residing at Coudersport, in the county of Potter and State of Pennsylvania, have invented certain new and useful Improvements in Rolling-Pins, of which the following is a specification.

This invention relates to improvements in that class of kitchen utensils commonly known as "rolling-pins."

The ordinary form of rolling-pin now in use comprises, essentially, a main rolling-cylinder adapted to roll the dough flat, said cylinder being provided with suitable handles by which it may be manipulated.

The essential feature of my invention is to provide in a single article a plurality of rollers which when assembled are concentrically nested one within the other to economize room, as well as to afford a convenient disposition thereof. The purpose in providing a plurality of rollers is to secure a combined article embodying both the smooth and cutting types of rolling-pins.

For a full description of the invention and the merits thereof and also to acquire a knowledge of the details of construction of the means for effecting the result reference is to be had to the following description and accompanying drawings.

While the essential and characteristic features of the invention are susceptible of modification, still the preferred embodiment of the invention is illustrated in the accompanying drawings, in which—

Figure 1 is a perspective view showing the preferred embodiment of the invention. Fig. 2 is a plan view showing the nested rollers extended from the main outer roller. Fig. 3 is a vertical sectional view. Fig. 4 is an end elevation showing the latch means carried by one end of the outermost roller.

Corresponding and like parts are referred to in the following description and indicated in all the views of the drawings by the same reference characters.

The rolling-pin structure which forms the basis of my invention comprises a plurality of rollers, which for purposes of this description will be designated the "outer" smooth roller 1, an "intermediate" cutting-roller 2, and an "innermost" cutting-roller 3. Preferably the outer and intermediate rollers 1 and 2, respectively, are hollow, so as to admit of the nesting arrangement which has been before premised upon. The outer roller 1 is provided with a smooth peripheral portion, so as to be used in the usual manner to roll the dough into a flattened condition. The intermediate roller 2, which is hollow, is provided upon its peripheral portion with suitable cutting devices 4, those illustrated being utilized for cutting the flattened dough into circular sections. The circular section of the dough might be used for making cookies, doughnuts, or like articles of pastry. The inner roller 3 is also a cutting-roller, being provided with a plurality of spiral blades 5, which are used to cut dough into strips which are necessary for making noodles or the like. The inner roller 3 carries the handles 6, which may be secured to this roller in any manner in the contemplation of my invention, and these handles 6 are common to each of the rollers, so that they may be used for manipulation of the device when either one or more of the nested rollers are being used. In order to prevent displacement of the inner roller or rollers from the outer roller, the latter is provided at one end with a cap 7, having an opening therein through which a handle 6 may be passed. Both of the handles 6 are provided adjacent the point of connection with the inner roller 3 with annular grooves 8, which are adapted to be engaged by a latch device 10, pivoted to the cap 7, so as to interlock with and prevent accidental displacement of the inner roller. The frictional contact of the inner roller, or more properly of the knives 5 thereon, with the intermediate roller 2 serves to effectually prevent any displacement of this last-mentioned roller. Both of the handles being provided with the grooves 8, it will be noted that the rollers 2 and 3 may be introduced into the outer roller 1 either end foremost. The end of the roller 1 opposite that upon which the cap 7 is disposed may be left open, as found desirable.

In the practical use of my rolling-pin the dough may be rolled with the outer smooth roller 1 initially, and then the inner rollers 2 and 3 may be utilized to cut the dough into the desired shape, dependent upon the use to which same is to be put. It will be noted that the nested rollers 2 and 3 may be provided with any preferred form of cutting device and that two or more of these rollers may be disposed within the outer roller 1. To use the cutting-rollers, it is only necessary to disengage the latch 10 to admit of removal of these rollers from the main outer roller 1.

Having thus described the invention, what is claimed as new is—

1. In a rolling-pin, the combination of a main outer roller, an inner nested roller adapted to be introduced into the outer roller either end first and provided with handles projecting from the ends of the outer roller, and a lock device carried by the outer roller and adapted to engage the inner roller at either end thereof to prevent displacement of the same.

2. In a rolling-pin, the combination of a main outer roller, an innermost roller nested within the outer roller, an intermediate roller or rollers between the innermost and outer rollers aforesaid, and handles carried by the inner roller and projected from opposite ends of the other rollers for manipulation of the latter, either separately or together.

3. In a rolling-pin, the combination of an outer roller, an inner roller nested within the outer roller, handles carried by the opposite ends of the inner roller and provided with annular grooves thereon, and a latch device pivoted at one end of the outer roller and adapted to engage the groove of one of the handles of the inner roller.

4. In a rolling-pin, the combination of an outer hollow roller, an inner roller nested within the outer roller, handles projected from the inner roller, and interlocking means between the outer roller and a handle of the inner roller to prevent displacement of the latter.

5. In a rolling-pin, the combination of an outer roller, an innermost roller provided at opposite ends with handles, and an intermediate roller or rollers between the innermost and outer rolls, said innermost and intermediate rollers being provided with cutting devices or the like.

6. In a rolling-pin, the combination of an outer hollow roller, a cap at one end of said roller and provided with an opening therein, an inner roller or rollers disposed within the outer roller, handles projected from opposite ends of one of said inner rollers, one of the handles extending through the opening in the cap of the outer roller, and a latch device mounted upon the cap of the outer roller and adapted to engage either handle of the inner roller aforesaid to prevent displacement thereof.

In testimony whereof I affix my signature in presence of two witnesses.

FRANK B. DEITER. [L. S.]

Witnesses:
 WM. A. SHEAR,
 SUMNER P. OLMSTED.